（12）United States Patent
Anliker et al.

(10) Patent No.: US 9,095,154 B2
(45) Date of Patent: Aug. 4, 2015

(54) DEVICE FOR PRODUCING AND DISPENSING BEVERAGES MIXED FROM MILK WITH LIQUID FLAVORING AGENTS

(71) Applicant: EGRO SUISSE AG, Dottikon (CH)

(72) Inventors: Markus Anliker, Granichen (CH); Markus Landolt, Zurich (CH)

(73) Assignee: EGRO SUISSE AG, Dottikon (CH)

( * ) Notice: Subject to any disclaimer, the term of this patent is extended or adjusted under 35 U.S.C. 154(b) by 0 days.

(21) Appl. No.: 14/047,738

(22) Filed: Oct. 7, 2013

(65) Prior Publication Data

US 2014/0037820 A1 Feb. 6, 2014

Related U.S. Application Data

(62) Division of application No. 12/672,370, filed as application No. PCT/CH2008/000329 on Jul. 23, 2008, now abandoned.

(30) Foreign Application Priority Data

Aug. 6, 2007 (CH) ...................................... 1243/07

(51) Int. Cl.
*B67D 7/74* (2010.01)
*B67D 7/70* (2010.01)
*B67D 7/06* (2010.01)
*A23C 9/156* (2006.01)
*A47J 31/40* (2006.01)
*A47J 31/60* (2006.01)

(52) U.S. Cl.
CPC ............... *A23C 9/156* (2013.01); *A47J 31/402* (2013.01); *A47J 31/60* (2013.01)

(58) Field of Classification Search
USPC ................ 222/129.3, 129.4, 135, 136, 145.5, 222/145.6, 255
See application file for complete search history.

(56) References Cited

U.S. PATENT DOCUMENTS

| | | | | |
|---|---|---|---|---|
| 2,109,896 A | * | 3/1938 | Anderson et al. | 137/207.5 |
| 2,990,978 A | | 7/1961 | Charos | |
| 3,276,633 A | * | 10/1966 | Rahauser | 222/129.1 |
| 3,335,911 A | | 8/1967 | Stutz | |
| 3,377,964 A | * | 4/1968 | Bell et al. | 425/131.1 |
| 3,938,784 A | | 2/1976 | Moreton | |
| 4,653,281 A | | 3/1987 | Van Der Veer | |
| 5,619,901 A | | 4/1997 | Reese et al. | |
| 5,653,157 A | * | 8/1997 | Miller | 99/275 |

(Continued)

FOREIGN PATENT DOCUMENTS

WO 2006/135864 A2 12/2006

*Primary Examiner* — Paul R Durand
*Assistant Examiner* — Vishal Pancholi
(74) *Attorney, Agent, or Firm* — Sughrue Mion, PLLC

(57) ABSTRACT

A device for producing and dispensing different beverages, which are mixed from milk and different flavoring agents. A mixing chamber (3) is provided, having a milk feed line (2) and a line (8) for discharging the milk-flavoring agent mixture. The device further has at least one reservoir (5) for receiving the flavoring agent (S2, S2, S3, Sn), wherein each reservoir (5) is connected with a supply line (7) via a metering device or delivery pump (4) and a feed line (6) to the mixing chamber (3) of each flavoring agent (S1, S2, S3, Sn) such that the flavoring agent (S1 ... Sn), which can be delivered into the mixing chamber (3) in a metered manner by means of the delivery pump (4), can be mixed therein with the milk, wherein the mixed beverage can be dispensed via the dispensing line (8).

7 Claims, 1 Drawing Sheet

(56) References Cited

U.S. PATENT DOCUMENTS

| | | |
|---|---|---|
| 5,706,661 A | 1/1998 | Frank |
| 5,727,713 A * | 3/1998 | Kateman et al. .......... 222/145.6 |
| 5,960,701 A | 10/1999 | Reese et al. |
| 6,099,878 A | 8/2000 | Arksey |
| 6,689,410 B2 | 2/2004 | Gerber |
| 2004/0009281 A1 | 1/2004 | Green |
| 2005/0095341 A1 | 5/2005 | Sher et al. |
| 2005/0223911 A1 | 10/2005 | Landolt |
| 2006/0086753 A1 | 4/2006 | Newton |
| 2006/0286262 A1 | 12/2006 | Stearns et al. |

\* cited by examiner

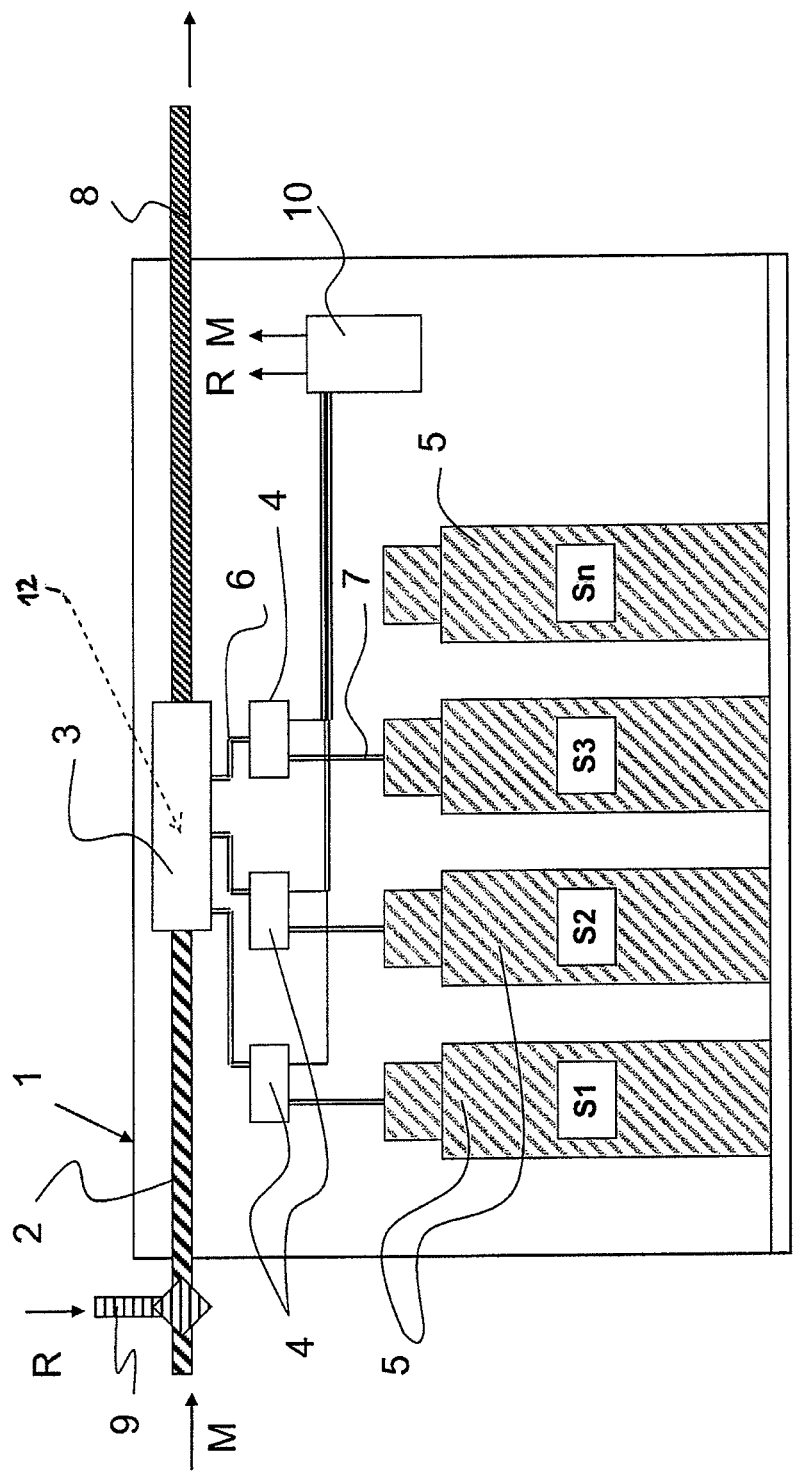

DEVICE FOR PRODUCING AND DISPENSING BEVERAGES MIXED FROM MILK WITH LIQUID FLAVORING AGENTS

CROSS-REFERENCE TO RELATED APPLICATIONS

This is a divisional of U.S. patent application Ser. No. 12/672,370, filed Aug. 5, 2010, which is the National Stage of PCT/CH2008/000329 filed Jul. 23, 2008 (which claims benefit of Swiss Patent Application No. 1243/07, filed Aug. 6, 2007), the disclosures of which are hereby incorporated by reference.

BACKGROUND

The present invention relates to a device as defined in the pre-characterizing clause of claim 1.

Following a trend, cold and warm milk drinks processed with flavoring agents and coffee-flavored milk drinks are being offered in the food and beverage industry in addition to the known pure coffee drinks and coffee milkshakes. As a result of the addition of flavoring agents, an entirely individual taste sensation is enabled by the milkshakes. For producing these mixed drinks, a coffee milkshake is conventionally prepared at first and a flavoring agent in the form of a syrup is then admixed to the drink. The flavoring agent is manually pumped out of a syrup container by means of a pump mounted on the container and admixed to the drink. This process is time-consuming for the operating personnel and not feasible in self-service restaurants. Furthermore, the flavoring-agent syrup is not always metered in equal portions when added manually and is not optimally intermixed with the milk or the coffee-flavored milk drinks.

SUMMARY

The object underlying the present invention is to eliminate these disadvantages. This object is achieved by the characterizing features of claim 1.

The invention is based on the idea of automating the process of adding flavoring agents to milk and stifling the same for preparing milkshakes and/or coffee milkshakes of different flavors, it being possible to pre-select the metering of the flavoring agent and the dispensing amounts of milk by means of a control system. The device is intended to be part of a beverage-making machine such as a coffeemaker and is disposed in the milk-supply region of the beverage-making machine. A predetermined amount of milk is pumped into a mixing chamber with the aid of a feed line out of a milk container accommodated in a refrigerated area. The device comprises one or more reservoirs for flavoring agents of various flavors. A line is guided from each reservoir to the mixing chamber by way of a metering device such as a metering pump. The metering device selected by the control system delivers the predetermined amount of flavoring agent into the mixing chamber where the former is stirred with milk and supplied as a milk-syrup mixture via a dispensing line to a milk foamer and/or the coffeemaker and is dispensed here as a milkshake or a coffee milkshake. For preventing any residual syrup or residual milk-syrup mixture in the mixing chamber and in the dispensing line, the syrup supply is timed such that the amount of milk required for cleaning purposes is added to the beverage after the mixing process so that the correct mixing ratio is adjusted on the whole.

According to a further embodiment of the invention, a branch line that opens into the milk feed line can be connected to a steam or water feed line. With the aid of this steam or water feed line, a rinsing process of the milk feed line, the mixing chamber and the dispensing line can be carried out either manually or completely automatically.

BRIEF DESCRIPTION OF THE DRAWINGS

The invention will be described below with reference to the exemplary embodiment illustrated in the accompanying drawing.

FIG. 1 is a schematic representation of the device of the invention.

DETAILED DESCRIPTION OF EXEMPLARY EMBODIMENTS

FIG. 1 schematically shows the device 1 of the invention for producing and dispensing different beverages mixed from milk and different liquid flavoring agents. The term "flavoring agents" is mainly understood to mean syrupy, concentrated liquids of different flavors such as vanilla, chocolate, nutty flavors or Amaretto. The device comprises a mixing chamber 3 having a milk feed line 2 and a line 8 for discharging the milk-flavoring agent mixture. The reservoirs 5 of the different liquid flavoring agents S1 . . . Sn are disposed in the immediate vicinity of the mixing chamber 3 in the device 1.

From each reservoir 5, a suction line 7 is guided to a metering device or a delivery pump 4. The delivery pump 4 is connected to the mixing chamber 3 via a feed line 6. The flavoring-agent feed line 6 opens into the mixing chamber 3 vertically from below. As a result, only the amount of syrup delivered by the delivery pump 4 is introduced into the mixing chamber 3, and it is impossible for the syrup to continue to flow from the feed line 6 into the mixing chamber.

Also, the density of syrups that is higher than that of milk prevents milk from entering the feed lines 6.

Depending on the number of options for connecting the syrup feed lines 6 to the milk chamber 3, one or more reservoirs 5 can be connected to the mixing chamber by means of assigned suction lines 7 and delivery pumps 4. The number of connectable reservoirs 5 depends only on the size of the device 1 and the number of connections to the mixing chamber 3. Each of the reservoirs 5 comprises a different flavoring agent S1 . . . Sn. The more reservoirs 5 connected to the mixing chamber 3, the wider is the variety of drinks producible therewith.

The delivery pumps 4 serve as metering pumps that deliver more or less amounts of syrup into the mixing chamber 3 depending on the operating time. Peristaltic pumps are particularly suitable for use as delivery pumps 4 for the metered delivery of the syrups. Injection devices for the metered addition of the flavoring agents are conceivable and particularly suitable for adding highly concentrated flavors. Means for swirling and stirring the milk with the flavoring agent introduced via the feed line 6 are disposed in the mixing chamber 3. These means can be, for example, perforated plates 12 or specially disposed flow channels that make it impossible for the milk introduced under pressure into the mixing chamber 3 to directly flow through the mixing chamber 3. As a result of the swirling of the milk in the mixing chamber 3, the flavoring agent introduced into the mixing chamber 3 intermixes well with the milk and is supplied in the form of a milk-syrup mixture via the dispensing line 8 to a milk foamer and/or coffeemaker and is dispensed here as a milkshake or as a coffee milkshake.

The device further comprises a control system 10 which regulates the time sequence and the duration of milk supply M. For this purpose, either a delivery pump for delivering milk from the refrigerated container and/or a valve in the milk feed line 2 is controlled. Likewise, the duration of the delivery of the flavoring agents S1 . . . Sn with the aid of the delivery pumps 4 is regulated with the aid of this control system. For preventing any residual syrup or residual milk-syrup mixture in the mixing chamber 3 and in the dispensing line 8, the syrup supply is timed such that the amount of milk required for cleaning purposes is added to the beverage after the mixing process so that the overall correct mixing ratio is adjusted after the total amount of milk has been discharged.

In an additional embodiment of the invention, a branch line 9 is provided that opens into the milk feed line 2. The branch line 9 is connected to a steam or water feed line R that can be regulated by the control system 10. With the aid of this steam or water feed line R, a rinsing process of the milk feed line 2, the mixing chamber 3 and the dispensing line 8 can be carried out either manually or completely automatically. The term "manual rinsing process" means that the cleaning process is started by activating a release button. In contrast, the term "automatic cleaning process" is understood to mean that the rinsing process is carried out at regular time intervals or after a defined number of beverage portions.

The automatic process for preparing a milkshake using the device of the invention is carried out, for example, by activating a flavor selector key. As a result, the metering device or delivery pump 4, which pumps the selected flavor S from the reservoir 5 into the mixing chamber 3, is put into operation. At the same time, the milk supply M is initiated by switching on the milk-pump in the refrigerated container and opening the milk supply valve. As soon as the preprogrammed time for delivering the syrup has lapsed, the delivery pump 4 stops and prevents any further syrup supply into the mixing chamber. The milk flowing under pressure into the mixing chamber is stirred with the syrup and arrives via the dispensing line 8 into the beverage-making machine and can be dispensed here as a cold beverage or via a milk foamer as a warm milkshake or it can be added to coffee for preparing a coffee milkshake. Since the flavoring-agent supply ends before the milk supply, the milk chamber 3 is cleaned using the continued flow of milk so that there are no residual amounts of milk-syrup mixture present in the mixing chamber 3 and in the dispensing line 8 upon conclusion of the removal process of the mixed beverage. In the case of a subsequent removal of a mixed beverage having a different flavor, it is thus ensured that there result no undesirable flavor-milk mixtures.

It is also conceivable to admix not only a flavoring agent to the milk during one cycle but to also selectively and simultaneously add several flavoring agents S1, S2 to the milk. This is possible by means of the control system 10 that controls the corresponding metering pumps.

The invention claimed is:

1. A process for producing and dispensing different beverages, which are mixed from milk and at least one flavoring agent having a density higher than that of milk, comprising:
   selecting at least one flavoring agent from amongst a plurality of flavoring agents, wherein each one of the plurality of flavoring agents is contained in a respective separate reservoir;
   selectively pumping the selected at least one flavoring agent, via a respective delivery pump, from the reservoir connected to the pump directly into a mixing chamber via a respective flavoring agent feed line directly connected vertically upward from below the mixing chamber to a bottom surface of the mixing chamber;
   delivering milk via a milk feed line, separate and distinct from the at least one flavoring agent feed line, into the mixing chamber;
   mixing the selected at least one flavoring agent with the milk inside the mixing chamber to create a mixed beverage;
   ending pumping of the selected at least one flavoring agent into the mixing chamber before stopping the milk supply to the mixing chamber to clean the mixing chamber by using a continued flow of the milk; and
   dispensing the mixed beverage out of the mixing chamber via a dispensing line.

2. The process according to claim 1, wherein the mixing the selected flavoring agent with the milk includes swirling and stirring the milk with the selected flavoring agent inside the mixing chamber.

3. The process according to claim 2, wherein the mixing chamber includes perforated plates for swirling and stirring the milk with the selected flavoring agent.

4. The process according to claim 1, further comprising cleaning the mixing chamber after the mixing is completed, using a control system which controls a time sequence of the milk supply and of the delivery of the selected flavoring agent.

5. The process according to claim 4, further comprising cleaning the milk feed line, the mixing chamber and the dispensing line, by introducing steam or water into a branch line connected to the milk feed line, wherein a duration of the introduction of water or steam into the milk feed line and a time sequence between the milk supply and the cleaning is controlled by the control system.

6. The process according to claim 1, wherein a plurality of selected flavoring agents is simultaneously added to the mixing chamber, each via a dedicated flavoring agent feed line feeding vertically upward through the bottom surface of the mixing chamber.

7. The process according to claim 1, wherein a quantity of milk for cleaning the mixing chamber and the dispensing line is mixed into the mixed beverage after the mixing process is complete.

* * * * *